INVENTOR.
ANTHONY J. DE STASI
BY
Bruce & Brosler
HIS ATTORNEYS

INVENTOR.
ANTHONY J. DE STASI
BY
Bruce & Brosler
HIS ATTORNEYS

United States Patent Office 3,148,744
Patented Sept. 15, 1964

3,148,744
VEHICLE STEERING SYSTEM AND INCLUDED COMPENSATING STEERING LINKAGE
Anthony J. De Stasi, Oakland, Calif., assignor to Pacific Coast Engineering Company, a corporation of California
Filed Apr. 6, 1962, Ser. No. 185,658
2 Claims. (Cl. 180—79.2)

My invention relates to a steering system for vehicles, and more particularly to means for controlling the steering of the vehicle having no mechanical connection between its steerable wheels.

In order to obtain perfect steering on a vehicle when describing a curve, that is without slippage or drag on the wheels, it is essential that the center lines of all the wheel axles must meet at a common point at all times, though such common point may shift with changes in steering angle. In the more conventional type vehicle, where the two front wheels are steerable wheels, the center lines of both axles of the steerable wheels must pass through a common point on the common center line of the fixed rear wheels. This necessitates a different angular relationship of the inner and outer steerable wheels in effecting steering.

The conventional method of achieving this correct relationship of angular movement of the inner and outer steerable wheels when describing a curve, is by means of a mechanical tie bar and drag link assembly, oriented in the correct position to compensate for the difference of angular movement of the wheels, so essential in causing the vehicle to describe a turn without slippage or drag on the wheels. Such tie bar and drag link assembly are generally located in substantially the plane of the center line of the wheel axles. This, however, would prevent clear access to the space between the wheels, though in a conventional vehicle, this is no drawback as it does not interfere with the normal use of the same.

In a type of vehicle, such as in a mobile type gantry crane employed for hauling loads, such as cargo containers, however, the space between the wheels must be free and clear of any obstruction for such space is required in the handling of cargo, and consequently the tie bar and drag link means for use in steering cannot be employed, unless the tie bar and drag link by some unconventional means, are brought up the legs of the gantry crane and across the top of such vehicle. This would require very large and rigid mechanical levers and shafts, since the tie bar must be of sufficient strength to transmit forces necessary to angularly shift the wheels for steering, without excessive deflection and angular twists of such members, whether the wheels be mechanically or hydraulically actuated.

Among the objects of my invention are:
(1) To provide a novel and improved steering means for a vehicle;
(2) To provide a novel and improved steering means for a vehicle which has no mechanical connection tying one steerable wheel to another;
(3) To provide a novel and improved steering means for a vehicle, which will enable perfect steering without resorting to any mechanical connection tying one steerable wheel to another.

Additional objects of my invention will be brought out in the following description of a preferred embodiment of the same, taken in conjunction wtih the accompanying drawings wherein.

Figure 1:
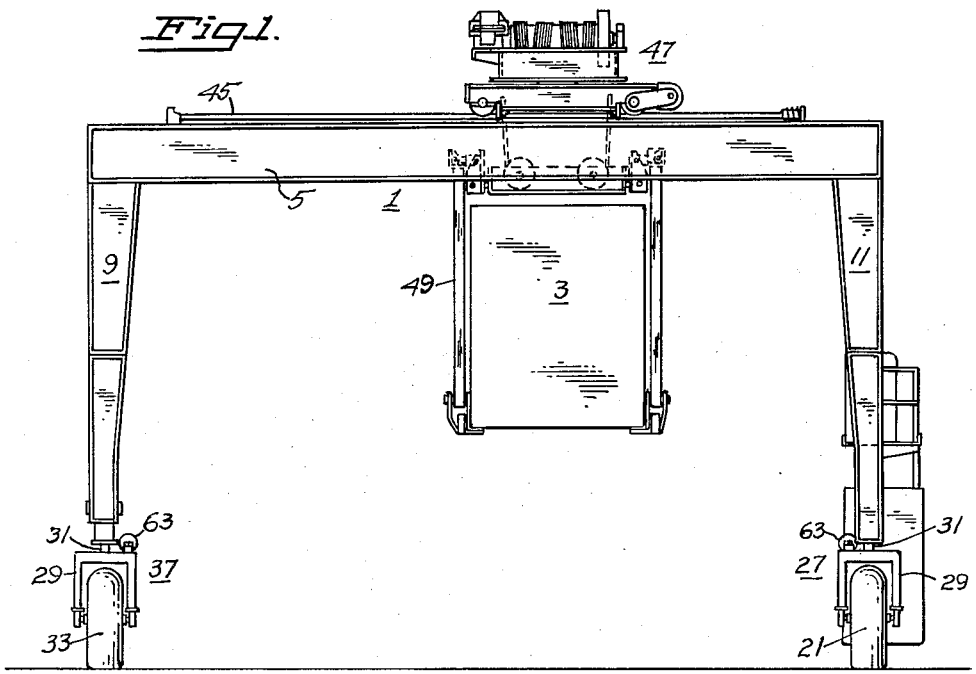
FIGURE 1 is a front view in elevation of a mobile gantry type crane having steerable wheels.
Figure 2:
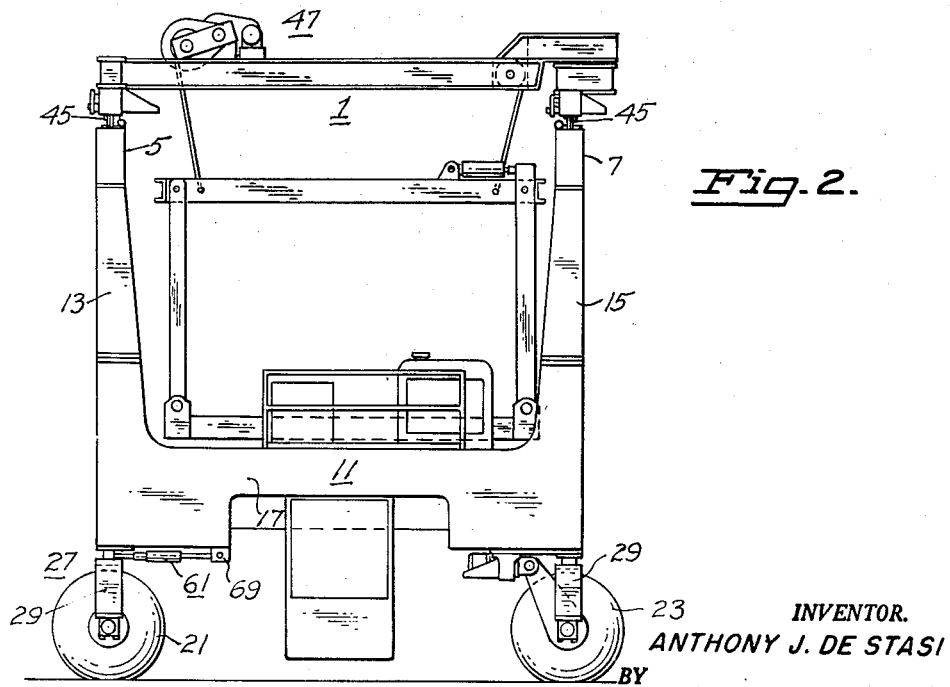
FIGURE 2 is a side view in elevation of the gantry type crane of FIGURE 1.
Figure 3:
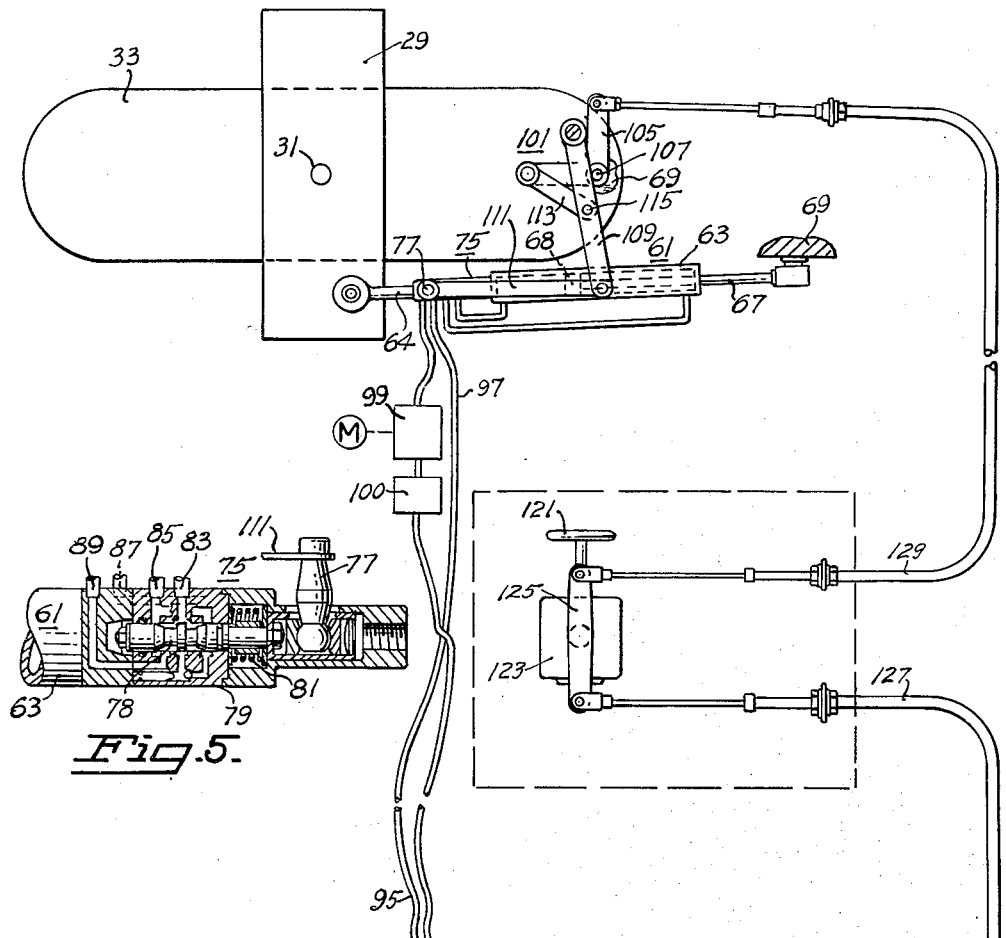
FIGURE 3 is a schematic view depicting the control system of the present invention as applied to steerable wheels, and showing the same in neutral position with the steerable wheels directed straight ahead.
Figure 5:
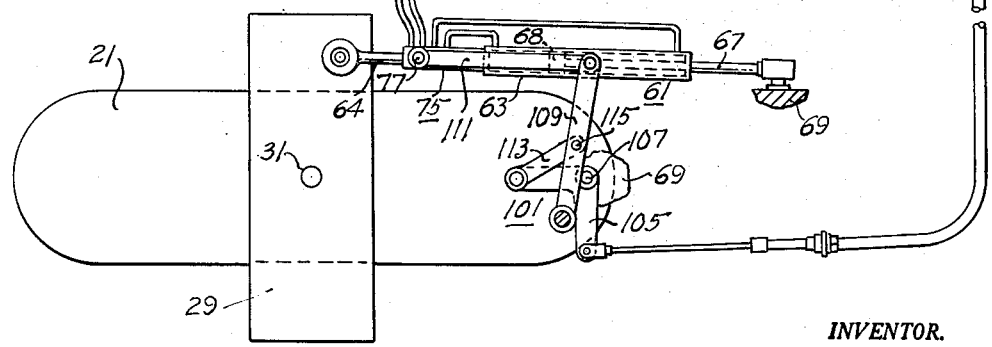
FIGURE 5 is a fragmentary view in section through an available servo valve assembly employed in the system of the present invention.
Figure 4:
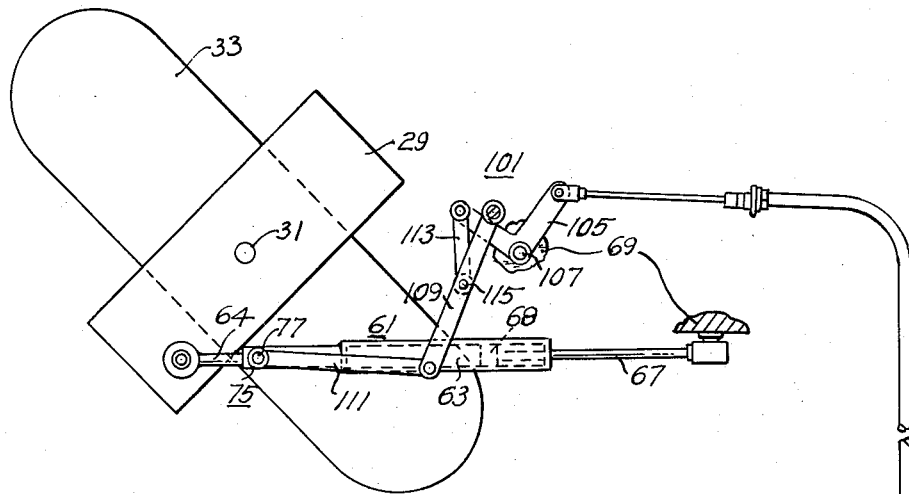
FIGURE 4 is a corresponding view showing the status of the control system as a result of turning the steerable wheels to a steering position.
Figure 4:
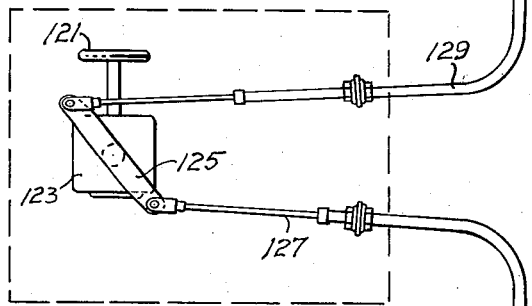
Figure 4:
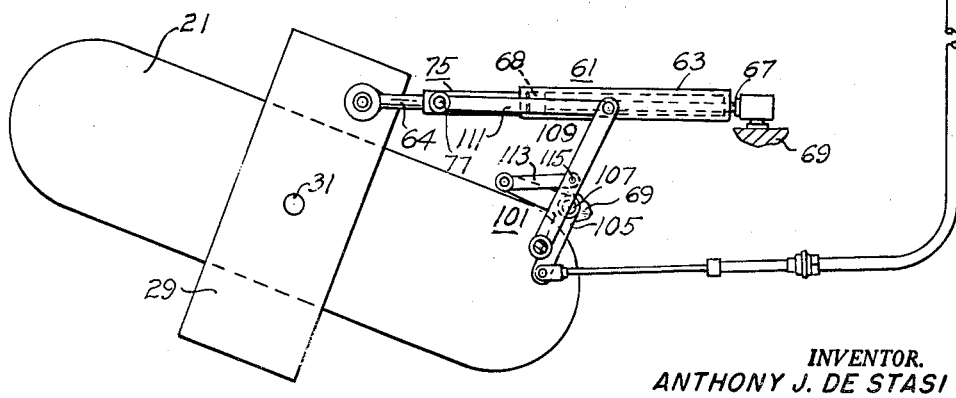

Referring to the drawings for details of my invention in its preferred form, the invention is depicted therein as applied to a mobile gantry type crane 1 designed for the lifting and hauling of heavy loads such as cargo containers 3 and the like.

The gantry type crane may be of any conventional form and construction, but generally involves spaced parallel girders 5, 7, the girders being supported upon the upper ends of a pair of parallel spaced U-shaped end frames 9, 11, each of which includes upright legs 13, 15 connected at substantially their lower ends by a cross beam 17.

One of the end frames is supported on wheels 21, 23 at least one wheel at each lower corner thereof, with one of the wheels 21 at one of the corners being a steerable wheel and constituting an element of a steerable wheels assembly 27 including a yoke 29 straddling the wheel and provided with a pivot shaft 31 extending upwardly from the yoke.

In like manner, the other end frame is supported on wheels, with that wheel 33 corresponding to the wheel 21, also being a steerable wheel and likewise constituting an element of a steerable wheel assembly 37 including a yoke 29 straddling the wheel and provided with a pivot shaft 31 extending upwardly from the yoke.

The gantry type crane, briefly described above, is provided along each of its main girders, with a rail 45, the two rails together comprising a track for supporting a trolley assembly 47 for movement from one end of the crane to the other, the trolley assembly supporting a cargo clamping frame 49 adapted, in the present instance, for the support of the cargo container 3. Inasmuch as cargo handled by the crane is apt to be shifted around anywhere between the end frames, the presence of any mechanical connections between the steerable wheel assemblies 27 and 37, to effect steering, can obviously not be tolerated.

In a vehicle of the type illustrated, in which only the front wheels are steerable wheels, to effect perfect steering, the center lines of the axis of these wheels must at all times converge to a point on the common axis of the rear wheels. In effecting a turn therefore, and at the same time to meet these requirements, the angular movement of the inner wheel must be greater than the corresponding angular movement of the outer wheel, and as a result, the inner wheel will execute a greater angle than the outer wheel within any given time.

Toward accomplishing this end, I pivotally connect to each yoke 29, at a shoulder thereof, a two-way power responsive means 61 for effecting angular rotation of the associated steerable wheel in either the clockwise or counter-clockwise direction, in accordance with the direction and extent of response to said power responsive means.

Such power-responsive means 61 may take any form of available equipment for the purpose, but in the specific embodiment of the invention as illustrated in the drawings, such two-way power-responsive means involves a power cylinder 63 having means 64 at one end for pivotally connecting the same to the proximate yoke 29, said cylinder being open at its other end for a piston rod 67 extending from a piston 68 within the cylinder, said piston rod being adapted for fixed attachment to an appropriate fixed point on the vehicle frame 69.

Assembled with the cylinder 63 is a servo-control valve assembly 75 for controlling the relative rate and direction of movement of the enclosed piston 68 in accordance with application of control force to one end of a ball stud actuator or valve control arm 77 which is coupled at its other end to the valve of the valve assembly.

Such control valve is available in the form of a spool 78 adapted to be shifted within a flow control cylinder 79 in either one direction or the other from a neutral position, by manipulation of the valve control arm 77 against the action of an enclosed spring 81. Cylinder 79 has a main inlet 83 and a main outlet 85 for hydraulic fluid such as oil for example, as well as a pair of inlet-outlet openings 87, 89 for feeding oil to the associated power cylinder 63.

When the valve control arm 77 is in neutral or center position, inlet oil supplied under pressure through a supply line 95 coupled to the control cylinder 79 at the main inlet 83, is free to flow around the spool and out through a return line 97 coupled to the control cylinder at the main outlet opening 85.

When the control arm 77 is shifted in one direction from its neutral position, the main flow around the spool will be blocked and is directed through one of the inlet-outlet openings, depending on the direction of shift, to one end of the power cylinder 63, while liquid discharged from the power cylinder will enter the control cylinder through the other inlet-outlet opening and thence into the return line 97.

The resulting movement of the power cylinder 63 and associated pivotal connecting means 64 will not only turn the pivotally connected wheel assembly, but will also act on the ball end of the control arm 77 to restore it to neutral position and hydraulically disconnect the power cylinder 63. The direction and extent of such turning of the wheel assembly will of course be a function of the direction and extent of the shift imparted to the control arm 77.

The two servo control valve assemblies are connected in series in a hydraulic system supplied by a positive displacement pump 99 from a tank 100, whereby, in the neutral position of both valves, the entire flow of the system will pass through the valve assemblies without feeding either of the power cylinders. With both control arms shifted, each valve assembly will supply liquid to its associated power cylinder until the control arm associated therewith is restored to its neutral position.

To effect steering of a vehicle when employing such two-way power-responsive means for angularly rotating the steerable wheels of such vehicle, it becomes necessary to simultaneously adjust each of such servo-valves in such direction and to such an extent as to obtain the same direction of angular rotation of the steerable wheels, and with a greater volume of liquid to that power cylinder controlling the steering of the inside wheel, which means that the inside wheel during steering must execute a greater angle of turn than the outer wheel.

The system which accomplishes this movement relationship of the steerable wheels of the vehicle involves a compensating lever system 101 associated with each of the two-way power-responsive means 61 and associated steerable wheel, such compensating lever system being adapted to control angular rotation of the associated steerable wheel in a clockwise direction or in a counter-clockwise direction, but to a greater degree in one direction than the other; that is, the angular movement being greater when the steerable wheel is functioning as the inside wheel in making a turn.

Each such compensating lever system includes a bell crank lever 105 which is pivotally mounted at its fulcrum point 107 to a fixed point on the vehicle in proximity to the yoke 29 of the associated steerable wheel. Also pivotally secured to the frame of the vehicle, at a point close to the pivotal axis of the bell crank lever 105, is a control lever 109 which is connected at its free end to the servo-valve assembly control arm 77 through a spacer link 111.

An intermediate link 113, pivotally connecting one arm of the bell crank lever 105 to an intermediate point 115 on the control lever 109, makes the control lever 109 respond to angular movements of the bell crank lever and in a direction corresponding to the angular direction of movement to the bell crank lever; but for equal angles of movement of the bell crank lever 105, the rate or extent of movement of the control lever 109 will be greater in the one direction than in the other.

In order that the identical lever compensating assembly may be employed in association with each of the steerable wheels 21 and 33, each of the two-way power-responsive means 61 is pivotally secured to the inner shoulder of the yoke of the steerable wheel assembly it controls, with the lever compensating assembly 101 associated with the one power responsive means, being reversed with respect to the opposite lever compensating assembly such that one may be deemed the mirror image of the other. When so mounted, an angular swing of the free end of the one bell crank lever 105 in one direction, will produce a large turning angle of the associated steerable wheel, while the same angular swing in the opposite direction, of the bell crank lever in the other lever compensating assembly will cause angular rotation of the associated steerable wheel in the same direction but through a smaller angle. And conversely, when the first bell crank lever is angularly swinging in the opposite direction, it will cause its associated wheel to turn in the opposite direction but to a smaller degree, while a reversal of the other bell crank lever will reverse the turn of its associated wheel, but to a geater degree, thereby meeting the basic requirements for steering.

The application of the necessary simultaneous forces to both lever compensating assemblies to accomplish simultaneous steering of both wheels, is placed under control of an operator from his station on the vehicle, which in the case of a gantry crane type cargo handling device, may be located within one of the end frames of the vehicle. At such station, the operator may be provided with a steering wheel 121 coupled through a gear reducer 123 to a reducer lever 125, one end of which is connected through a push-pull cable 127 to the free end of one of the bell crank levers 105 while the other end of the reducer lever is similarly connected to the free end of the bell crank lever of the other lever compensating assembly through a push-pull cable 129. Thus, in rotating the steering wheel, one of the cables will be pulled through a like distance, and by reason of the above described manner of mounting the various lever compensating assemblies, both steerable wheels will be rotated in the same direction, with the inner wheel executing the greater angle. Through proper design of the levers and links involved in the lever compensating assemblies to fit the particular vehicle on which they are used, the extent of angular rotation of the steering wheels can be made such as to fulfill the requirements for perfect steering.

The employment of cables for transmitting the control force from the operator's station to the respective lever compensating lever assemblies, makes it a relative simple matter to install such a system in a vehicle of the gantry crane type, for such cables may be run along the frame members of the vehicle from the operator's station to their destinations as through the use of simple mounting clips, without impairing their ability to transmit the control forces from the operator's station to each lever compensating assembly. In lieu of such cables, force transmitting rods coupled through miter gears or the like may be utilized by mounting of the rods along frame members and coupling them through miter gears or the like, whereby the same will not interfere with the free handling of cargo between the end frames of the gantry crane.

The system of the present invention thus distinguishes in a basic manner from the conventional steering mechanism employing a mechanical bar and drag links as a mechanical tie between the steerable wheels, in that in the conventional system, the steering power is directly applied to one of the steerable wheels and is transmitted mechanically through the tie bar and drag links to the other steerable wheel, whereas in the present invention, the force transmitted from the operator's station is a control force only, and is apportioned between the two lever compensating assemblies. As a control force it serves merely to actuate the servo valves, which in turn, control the steering power applied to each steerable wheel. Accordingly, the control system need handle little in the way of power, and therefore may be quite light and flexible in construction, though quite accurate in its control function.

From the foregoing description of my invention in its preferred form, it will be apparent that the same is subject to alteration and modification without departing from the underlying principles involved, and I accordingly do not desire to be limited in my protection to the specific details illustrated and described, except as may be necessitated by the appended claims.

I claim:

1. In a vehicle having steerable wheel assemblies without a connecting rod coupling said assemblies, and with each wheel assembly including a wheel, a yoke and pivot shaft, apparatus for angularly rotating said wheels on their pivot shafts to effect steering, said apparatus comprising, a steering arm on the steering pivot shaft of each of said steerable wheel assemblies, independent two-way power responsive means coupled to each yoke to enable angular rotation of an associated wheel about its pivot axis in either the clockwise or counter-clockwise direction in accordance with the direction and extent of response of said power responsive means, each of said two-way power-responsive means comprising a power steering cylinder having servo-valve means including a control rod for establishing the volume of hydraulic fluid to its associated cylinder and the direction of flow of said fluid through said cylinder, and means for simultaneously actuating said control rods to different extents sufficient to cause said power responsive means to effect unlike volumes of fluid to said power cylinders and in such manner as to produce angular rotation of said steerable wheels in like direction.

2. In a vehicle having steerable wheel assemblies without a connecting rod coupling said assemblies, and with each wheel assembly including a wheel, a yoke and pivot shaft, apparatus for angularly rotating said wheels on their pivot shafts to effect steering, said apparatus comprising, independent two-way power-responsive means coupled to each yoke to enable angular rotation of an associated wheel about its pivot axis in either the clockwise or counter-clockwise direction in accordance with the direction and extent of response of said power responsive means, each of said two-way power-responsive means comprising a power steering cylinder having servo-valve means including a valve control arm for establishing the volume of hydraulic fluid to its associated cylinder and the direction of flow of said fluid, means for simultaneously actuating each of said power-responsive means to effect unlike volumes of fluid to said power cylinders but in the same direction, to produce angular rotation of said steerable wheels in like direction but to different degrees, said last means including, in association with each two-way power-responsive means, means in the form of a compensating lever system adapted when actuated in one direction, to cause said power responsive means to angularly rotate the associated steerable wheel in a clockwise direction, and when actuated to the same extent in the opposite direction, to angularly rotate said steerable wheel in the counter-clockwise direction and through a different angle, one of said compensating lever systems being mounted to face in a direction opposite that of the other to enable movement of its associated wheel in the same direction as the other but to a greater degree, for equal actuation of said compensating lever systems, a manually operable steering control means, and means coupling said manually operable steering control means to each of said compensating lever systems in such manner as to cause rotation of said steerable wheels about their pivot axes and in the same direction.

References Cited in the file of this patent

UNITED STATES PATENTS

| | | |
|---|---|---|
| 2,909,298 | Baudhuin | Oct. 20, 1959 |
| 3,028,925 | Baudhuin | Apr. 10, 1962 |